(12) United States Patent
Roelfs et al.

(10) Patent No.: US 10,754,591 B2
(45) Date of Patent: Aug. 25, 2020

(54) DOCUMENT PROCESSING SYSTEM HAVING A PRINT CONTROLLER FOR PROCESSING A PRINT JOB

(71) Applicant: Océ Holding B.V., Venlo (NL)

(72) Inventors: Harmannus B. Roelfs, Venlo (NL); Marvin P. Brünner, Venlo (NL); Jan H. Geels, Venlo (NL); Daniel B. Blasiak, Montigny-le-Tilleul (BE)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 0 days.

(21) Appl. No.: 16/541,477

(22) Filed: Aug. 15, 2019

(65) Prior Publication Data

US 2020/0065032 A1 Feb. 27, 2020

(30) Foreign Application Priority Data

Aug. 24, 2018 (EP) ..................................... 18190761

(51) Int. Cl.
*G06F 3/12* (2006.01)
(52) U.S. Cl.
CPC .......... *G06F 3/1204* (2013.01); *G06F 3/1207* (2013.01); *G06F 3/1219* (2013.01); *G06F 3/1275* (2013.01)
(58) Field of Classification Search
None
See application file for complete search history.

(56) References Cited

U.S. PATENT DOCUMENTS

| 2008/0065455 A1* | 3/2008 | Sun ................. G06Q 10/06316 |
| | | 705/7.26 |
| 2010/0238484 A1* | 9/2010 | Komine ................. G06F 3/1204 |
| | | 358/1.15 |
| 2013/0027718 A1* | 1/2013 | Fujii ..................... G06F 3/1204 |
| | | 358/1.9 |
| 2017/0206041 A1* | 7/2017 | Van Horssen ........ G06F 3/1208 |

FOREIGN PATENT DOCUMENTS

| EP | 1 591 942 A2 | 11/2005 |
| EP | 2 492 800 A2 | 11/2005 |

OTHER PUBLICATIONS

European Search Report of application 18 19 0761 dated Oct. 30, 2018.

\* cited by examiner

*Primary Examiner* — Thomas D Lee
(74) *Attorney, Agent, or Firm* — Birch, Stewart, Kolasch & Birch, LLP

(57) ABSTRACT

A document processing system includes a print controller and a user interface for displaying production routes for a print job leading to an end product due to printing by at least one printer and finishing by at least one finisher. The user interface is configured to receive a user selection of a document type of the print job and at least one selection criterion for the print job. The print controller is configured to determine production routes based on simulation of the print job by device models for the at least one printer and the at least one finisher, and to select from the determined production routes a production route with smart settings which corresponds to the document type and fulfills the selection criterion.

10 Claims, 5 Drawing Sheets

DOCUMENT PROCESSING SYSTEM HAVING A PRINT CONTROLLER FOR PROCESSING A PRINT JOB

FIELD OF THE INVENTION

The present invention relates to a document processing system comprising a print controller connected to at least one printer and a user interface for displaying production routes for a print job leading to an end product due to printing by the at least one printer and due to finishing by at least one finisher. The present invention also relates to a method for the document processing system.

BACKGROUND OF THE INVENTION

It is known to implement document types for a single generic finisher or a single specific finisher. However, a production route delivering an end product may consist of a network of device models, i.e. more than one printer or more than one finisher. US patent application US20170206041 shows examples of descriptions of such production routes. When a user selects a specific printer from a list of configured printers, the selected printer is limited to a set of inline/online devices. The user is only supported to find one solution to achieve a specific end result that can actually be produced. Support is not offered to easily select a solution from multiple alternatives to achieve the end result.

In a print production process sheets are picked from an input tray, then an imposition is printed and several finishing steps are being done such as punching, folding, cutting, trimming, binding, stitching and so on.

Given a desired end result which is often specified by the one purchasing the printed end product, many ways of producing the end product exist given a certain equipment of a printer and a finisher. For example, a certain media type and weight is specified for an end product, but several sizes are on stock. Therefore a same-up production may be established, but it could also mean that other equipment would have to be used and additional actions would have to be performed such as cutting. By modelling the devices in the device models, the ways in which the devices perform become available. Solutions, i.e. production routes, may automatically be produced for the given end product.

It is an objective of the present invention to provide a document processing system that is capable of offering a selection for a production route for a desired end product.

SUMMARY OF THE INVENTION

According to the present invention the objective is achieved by the document processing system according to the invention wherein the user interface is configured to receive a user selection of a document type of the print job and at least one selection criterion for the print job, and the print controller is configured to determine production routes based on simulation of the print job by device models for the at least one printer and the at least one finisher, and to select from the determined production routes a production route with smart settings which corresponds to the document type and fulfills the selection criterion.

To establish a received document type a device policy being defined per device for the devices in a production route may be selected from the available device policies in order to produce the end product by the at least one printer and the at least one finisher. On the other hand multiple production routes may be grouped under a common document type. By grouping the production routes under a common document type, the user is assisted in deciding for an optimal production route.

The optimal production route is selected by taking a full history of simulated actions by the device models of the determined production routes into account.

According to an embodiment the selection criterion is an ecological criterion like decreasing waste of recording material to be consumed for the print job. An amount of waste media is produced by a production route. The amount of trimmed off, disposed and deflected sheets and sheets parts is accumulated over the total production route.

According to an embodiment the print controller is configured to derive trim and bleed information from the print job and to take the derived trim and bleed information into account for the ecological criterion. The trim and bleed information from the print job may be used to propose a maximum same up. Bleed boxes may be placed next to each other or a bit more apart if possible. At least 2 times bleed is trimmed off between two adjacent page cells. By doing so, a gutter is created to give room for the bleed of the two adjacent page cells. According to an embodiment the selection criterion is a preference criterion for a same-up printing and finishing.

In general, information derived from the print job or from the devices or from any other source may be needed for the ecological criterion or for any other selection criterion received from the user.

According to an embodiment the selection criterion is a productivity criterion which is one out of minimizing manual labor at printing and finishing, meeting a delivery time for the end product and meeting a specified quality of the end product.

The productivity criterion may be decreasing waste of time to be used by the operator to process the print job. A productivity of the production route may be determined by calculating a percentage of cross-feed capacity which is actually used in the production route, i.e. when printing sheets a widest possible sheet may be used. A number of manual actions to be taken for a certain production route like moving a stack from one device to another device, entering instructions on the user interface of a device, is taken into account. For meeting a delivery time of the end product, devices have to be used that are able to produce before a given delivery date. For meeting a prescribed quality of the end product, devices may be used with specific color profiles or color gamuts or runnability information of a sheet.

According to an embodiment the user interface is configured to receive at least one smart setting value to be fixed for the selected production route. The user interface is configured to enable a user fix settings which are mapped when switching production routes. The user is given required information to easily find the best production settings for a document at hand. Fixing some settings allows the user to enforce settings that may not be changed when selecting another one of the criterions for a document type. Directing the criterion to find an optimum solution for the production route takes these settings into account. According to a further embodiment the user interface is configured to undo such a manual change or fix of the at least one smart setting.

According to an embodiment the print controller is configured to switch from the selected production route to one other production route on request of the user via the user interface and to prohibit the one other production route to overrule the at least one fixed smart setting value of the selected production route. Fixed user settings are taken into account when switching production routes. For example, it does not matter if trimming is done inline or offline (same-up), the user specified end size remains the same.

The invention also relates to a method for producing a print end product by a document processing system comprising a print controller connected to at least one printer and a user interface for displaying production routes for a print job leading to an end product due to printing by the at least one printer and finishing by at least one finisher, the method comprising the steps of the user interface receiving a user selection of a document type of the print job, the user interface receiving at least one selection criterion for the print job, the print controller determining production routes based on simulation of the print job by device models for the at least one printer and the at least one finisher, the print controller selecting from the determined production routes a production route with smart settings which corresponds to the document type and fulfills the selection criterion, and producing the end product according to the determined production route by the at least one printer and the at least one finisher.

The invention further relates to a non-transitory software medium comprising executable program code configured to, when executed, perform the method according to the invention.

BRIEF DESCRIPTION OF THE DRAWINGS

Embodiment examples will now be described in conjunction with the drawings, wherein.

DETAILED DESCRIPTION OF THE EMBODIMENTS

Figure 1:
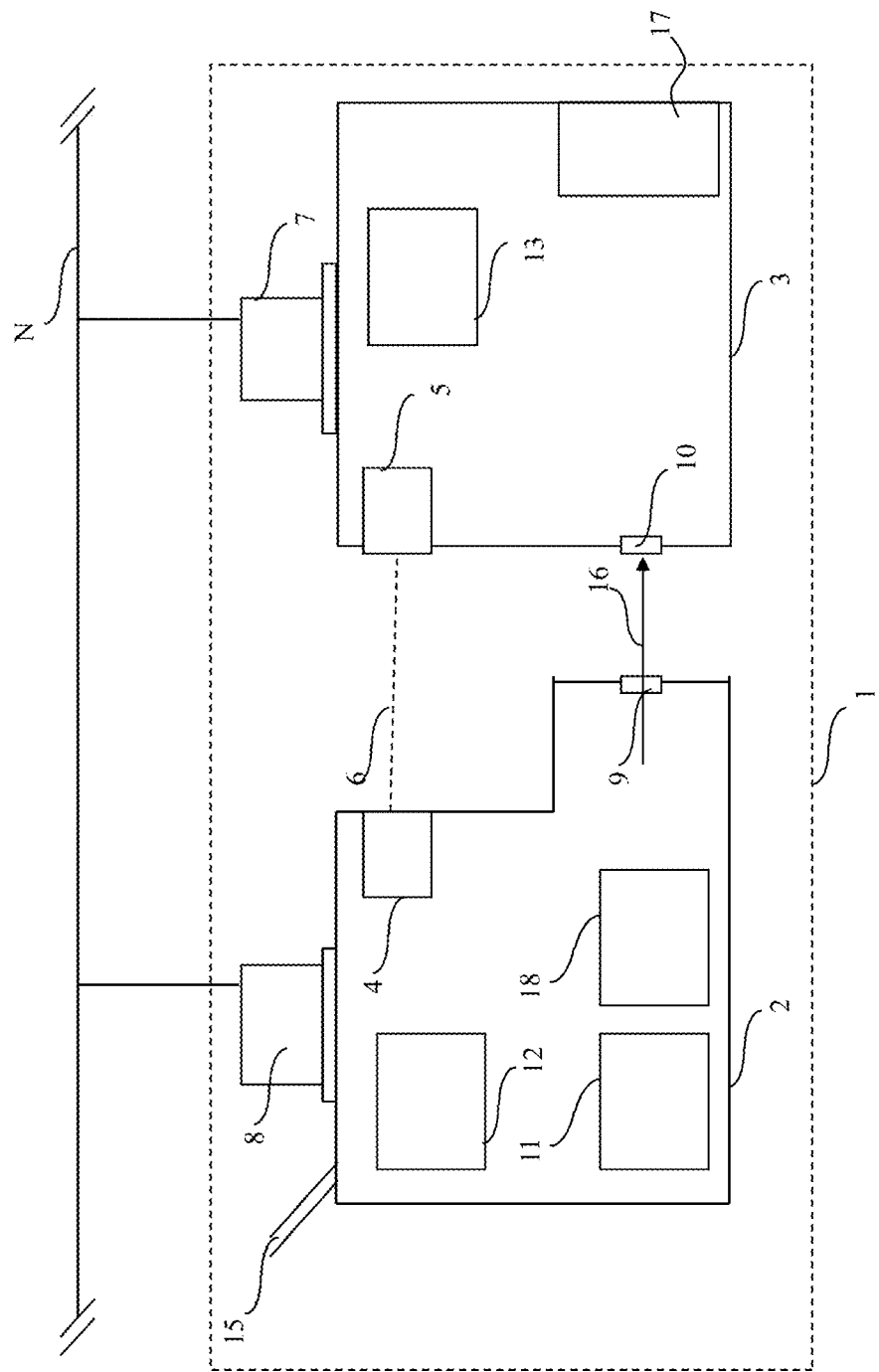
FIG. 1 is a block diagram of a document processing system according to the invention.

The present invention will now be described with reference to the accompanying drawings, wherein the same or similar elements are identified with the same reference numerals throughout the several views.

FIG. 1 is a block diagram of a document processing system 1 according to the invention. The view is showing the document processing system 1 comprising a printer 2, connected to a network N, a finisher 3 connected to the network N or remotely connected to the printer 2, a print interface 4 in the printer 2, a finishing interface 5 in the finisher 3, an optional data connection 6 between the print interface 4 and the finishing interface 5, a finishing module console 7, a print module console 8, a sheet outlet 9, a sheet inlet 10, a controller 12 in the printer 2, a finisher memory 13 in the finisher 3, an optional automatic document feeder 15 on the printer 2 for feeding sheets of the physical start product to the printer 2, at least one input holder 11, 18 for holding the physical start product like a stack of sheets and an output holder 17 on the finisher 3 for receiving and holding output of a plurality of sheets, for example a stack of printed and finished sheets.

The document processing system 1 comprises one printer 2 and one finisher 3, but more than one printer and/or more than one finisher may be envisioned in the document processing system 1. The one finisher 3 shown in FIG. 1 is an in-line finisher with a data connection 6 activated and an on-line finisher with the data connection 6 de-activated or missing, but other kinds of finishers may be envisioned.

The following table introduces definitions for in-line finishers, on-line finishers, off-line finishers and near-line finishers.

| Integrated into the printing | Settings Flow | |
| --- | --- | --- |
| production route? | YES | NO |
| Paper flow        YES | IN-line | ON-line |
|                   NO | NEAR-line | OFF-line |

The in-line devices and on-line devices are part of the printing device. The off-line devices and near-line device are not part of the printing device. The corresponding device models which are created for these finishing devices, reflect the aspects of in/on/off/near-line and multiple input and position of the in/on-line devices in the corresponding printer.

The document processing system 1 is configured to deliver at least one end print product according to specifications of the print job received via the network N by the document processing system 1. The document processing system 1 may find multiple options for producing the at least one end product.

The print interface 4 and the finishing interface 5 are configured to exchange digital information about printing and finishing instructions, which printing and finishing instructions are needed for processing the print job in order to lead to the desired end product. The print interface 4 and finishing interface 5 may exchange data via the network N. A printed sheet arrives at the sheet outlet 9 in order to enter the finisher 3 via the sheet inlet 10, the sheet flow direction indicated by arrow 16. A configuration with the data connection 6 is an in-line or near-line configuration. For an in-line or on-line configuration printed sheets flow automatically from the sheet outlet 9 to the sheet inlet 10. For a near-line or an off-line configuration printed sheets must be moved manually from the sheet outlet 9 to the sheet inlet 10. Furthermore a lack of a data connection like 6 implies an on-line or off-line configuration, where settings for the finisher have to be entered manually at the finisher.

Pre-printing instructions, printing instructions and finishing instructions may be part of specifications of the print job. Printing and finishing instructions may also be entered via a printer user interface console 8 and stored in the controller 12 of the printer 2. Finishing instructions may also be entered via a finisher user interface 7 and stored in the finisher memory 13 of the finisher 3.

Finishing instructions may be in a form of step-by-step actions to be executed by an operator, which may be on an instruction page, on a tablet, etc.

Each device of the document processing system 1 is described in a dedicated device model comprising constraints and capabilities of the device. The dedicated device models may be stored in the controller 12 of the printer 2. Based on the constraints and capabilities derived from the device models residing in the controller 12 the document processing system, in particular the controller 12, is configured to automatically check if output of a first device in the document processing system 1 which output is not a desired end print product is input for a second device in the document processing system 1.

The controller 12 may comprise the device models according to the invention. The device models may be part of a software application residing in memory of the controller 12 or may be implemented in one or more hardware units, or may be implemented as a combination of hardware and software in the controller 12.

In an embodiment at least one of the device models is part of a software or hardware application residing on at least one computer in the network N coupled to the printer 2 and/or the finisher 3. The device models may also be distributed among a plurality of computers in the network N. In this particular embodiment the at least one computer in the network is part of the document processing system 1. The network may expand into a cloud system or into an intranet or into the internet. The printer user interface console 8 may be used to display the production routes according to the invention. However, the production routes may also be displayed on a user interface comprised in the at least one computer in the network N. A mix of displaying production routes inside and outside the printer 2 may be envisioned.

The finisher 3 may be a trimming device, a cutting device, a punching device, a folding device, a laminating device or any other finishing device, or a device which combines before-mentioned finishing actions. It is also in the scope of the invention that the document processing system 1 comprises a plurality of finishers which is concatenated to a sequence or network of finishers positioned to allow sequential and/or parallel finishing. The plurality of finishers is used after a printing process on the printer 2. It is also in the scope of the invention that the document processing system 1 comprises a plurality of printers which is concatenated or positioned to allow sequential and/or parallel processing of the print job.

The at least one printer and the at least one finisher are available for use in the production of the at least one end print product according to the invention.

Figure 2:
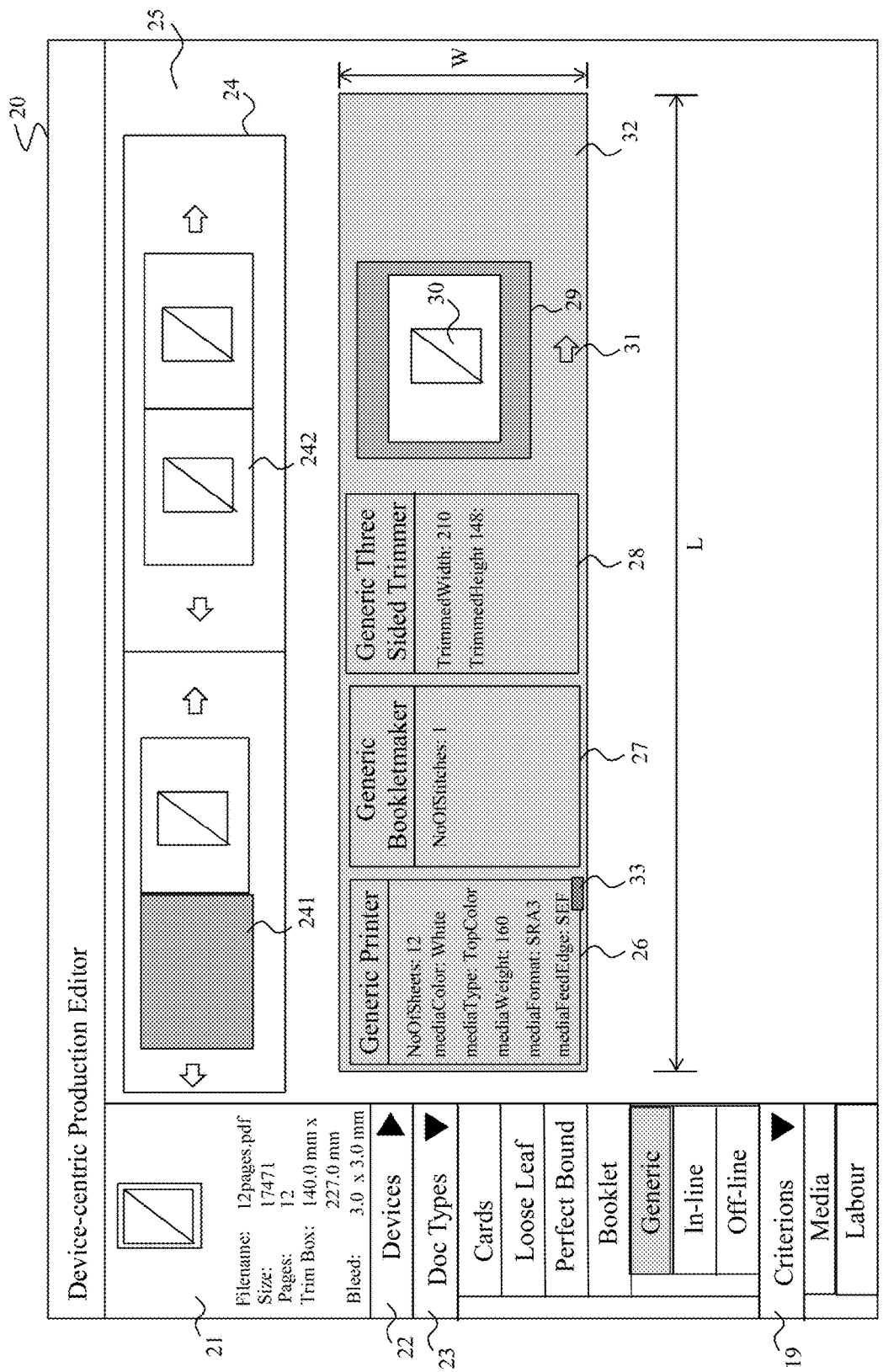
FIG. 2-4 are examples of production routes according to the invention.

FIG. 2 is an example of a first production route according to the invention. The production route is shown by means of a user interface window 20 for a device centric production editor installed in the document processing system 1. The window 20 comprises document specifications of an uploaded print file in PDF format—other formats may be envisioned—that should be produced by the document processing system 1. A first tab item 22 may be used and expanded into a device pool in order to select at least one device object for the production route to be created.

A second tab item 23 may be used to select a document type to be produced according to the invention.

Different production routes may be categorized as a document type. FIG. 2 shows four document types: business cards, loose leaf, perfect bound sheets and a booklet. For a booklet three production routes are available: a generic production route, an in-line production route, and an off-line production route. Information from an uploaded PDF file is shown in the top left corner item 21 and comprises a filename, a size, a number of pages, a trim box and a bleed.

A third tab item 19 may be used to select a selection criterion according to the present invention for the print job to be produced. By selecting a selection criterion from the third tab item 19 a number of production routes for the desired end product showing alerts qua constraints and capabilities of the devices in the production route may be increased. By doing so, the number of plausible production routes to be chosen from by the user may be rather limited and in fact reduces choice stress for the user.

According to an embodiment the selection criterion is an ecological criterion like decreasing waste of media to be consumed for the print job. The print controller 12 of the document processing system 1 is configured to derive trim and bleed information from the print job and to take the derived trim and bleed information into account for the ecological criterion.

According to an embodiment the selection criterion is a preference criterion for a same up imposition for printing and finishing (not shown).

According to an embodiment the selection criterion is a productivity criterion which is one out of minimizing manual labor at printing and finishing, meeting a delivery time for the end product and meeting a specified quality of the end product.

A default selection criterion may be set at installation of the device centric production editor, for example an ecological criterion.

A multiple select option for the selection criterion may be implemented as a feature of the third tab item 19.

The window 20 displays a workspace 25 for adding a production route 32 according to the invention.

The document processing system 1 is configured to enable a user to select one or more device objects from the first tab 22 and to add the one or more selected device objects to the production route 32.

Adding of the selected device to the production route may be done by dragging the selected device object to the production route.

The first production route 32 is displayed in one direction in a plane of the user interface window 20, i.e. horizontally.

On the other hand a complete production route may be loaded into the work space 25 by selecting a document type via the second tab item 23.

The first production route 32 is automatically constructed by selecting the booklet option "Generic" from the document types 23.

The first production route 32 comprises a first device object 26 representing a generic printer, a second device object 27 representing a generic booklet maker and a third device object 28 representing a generic three sided trimmer.

The first device object 26 comprises a list of smart default values for printer parameters with feedback on possible constraints resulting from simulation of the device models of the production route using the print job (PDL) specifications in item 21. The list may comprise for example a number of sheets, a media color of a media which is going to be consumed, a media type of the media, a media weight of the media, a media format of the media and/or a media feed edge of the media. A green execution button 33 may be activated to send print job instructions to the device labelled "Generic Printer".

The second device object 27 comprises a list of smart default values for booklet maker parameters with feedback on possible constraints resulting from simulation of the device models of the production route using the print job (PDL) specifications in item 21. The list may comprise for example a number of stitches in the booklet production.

The third device object 28 comprises a list of smart default values for trimmer parameters with feedback on possible constraints resulting from simulation of the device models of the production route using the print job (PDL) specifications in item 21. The list may comprise for example an editable trimmed width value and an editable trimmed height value.

The device objects 26, 27, 28 in the generic production route 32 all represent inline devices and do not have specific device constraints or policies. In fact, the device objects 26, 27, 28 offer a happy flow implementation of a production route. A smallest media size for printing the PDF mentioned in item 21—using trim and bleed information from item 21—is SRA3, where the three-sided trimmer uses the PDF trim box to set the trimmed width and height in the third device object 28 representing the generic three sided trimmer.

Near the third device object 28 a preview box 29 is shown of a preview 30 of a document intended to be produced by the generic production route 32 in the work space 25. The preview 30 reflects an end result of simulating the production route by the device models of the generic devices 26, 27, 28. The preview 30 may be updated when the production route or device parameters are changed or extended. The preview 30 corresponds to the smart default values shown in the lists in the device objects 26, 27, 28. The preview 30 is also called a work-in-progress preview. The preview 30 helps to distinguish from a spread preview 241 and an imposition preview 242. It means also that in case of a near-line or off-line finisher, another work in progress preview will be shown between the printer and said off-line or near-line finisher.

An indicator like an arrow 31 shows in which direction a next device object may be added after the third device object 28 in the first production route 32 if necessary.

In the top of the window 20 a preview area 24 is shown with the result of the constructed production route 32. The preview area 24 shows the spread preview 241 on the left side and the imposition preview 242 on the right side of the end result of simulating the production route 32 using the specified device parameters and the input file in item 21. With arrows positioned left and right of each preview the operator may step through the end result which resembles a reader leaving through the end product.

The first production route 32 has a relative large length L to a width W of the production route 32. The relative large length L is substantially displayed in the one direction on the window 20. The first production route 32 comprises the device objects 26, 27, 28 in a consecutive order of processing in the one direction of the length L of the production route 32. In the first production route 32 output of a device represented by a device object 26, 27 is respectively input for the next device 27, 28 represented in the production route 32.

Figure 3:
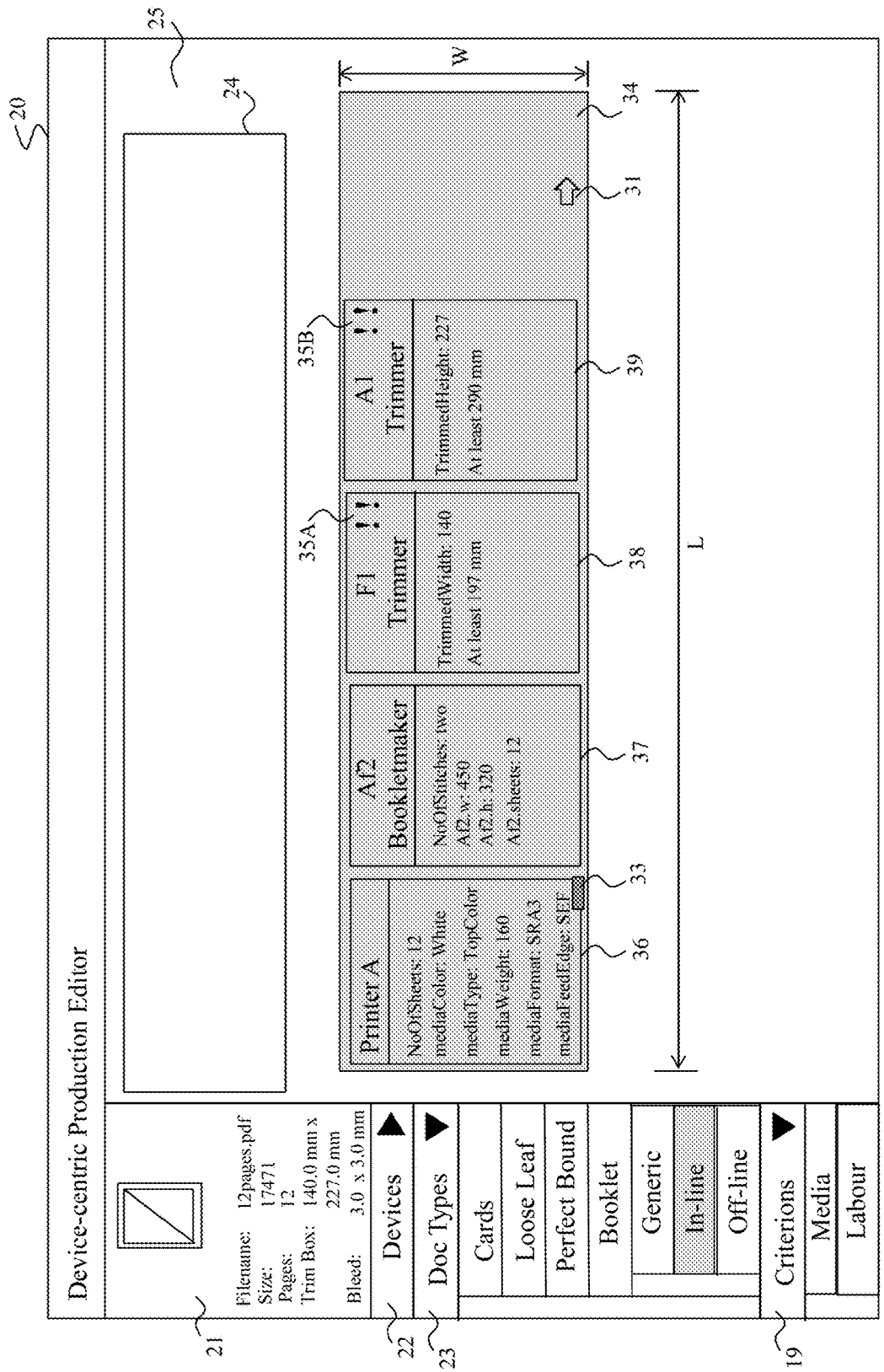

FIG. 3 is an example of a second production route 34 according to the invention. The first tab item 22 is again used to select at least one device object for the production route to be created. By means of the second tab item 23 a document type is selected that is going to be produced according to the production route to be constructed or selected.

The second production route 34 is added to the workspace 25 in window 20 replacing the first production route 32 as shown in FIG. 2.

The second production route 34 is constructed by selecting the booklet option "In-line" from the document types 23.

The second production route 34 comprises a first device object 36 representing a specific printer, a second device object 37 representing a specific booklet maker, a third device object 38 representing a first specific trimmer, and a fourth device object 39 representing a second specific trimmer.

The first device object 36 represents a specific printer labelled "Printer A" and comprises a list of smart default values for printer parameters with feedback on possible constraints resulting from simulation of the device model for the specific printer in the production route 34 using the print job (PDL) specifications in item 21. The list looks similar to the list for the generic printer 26 in FIG. 2. A green execution button 33 may be activated to send print job instructions to the device labelled "Printer A".

The second device object 37 comprises a list of smart default values for booklet maker parameters for the specific booklet maker labelled "Af2Bookletmaker" with feedback on possible constraints resulting from simulation of the device models of the production route using the print job (PDL) specifications in item 21. The list may comprise for example a number of stitches in the booklet production, a width value for the specific booklet maker, a height value for the specific booklet maker and a number of sheets for the specific booklet maker.

The third device object 38 comprises a list of smart default values for trimmer parameters for the first specific trimmer labelled "F1Trimmer" with feedback on possible constraints resulting from simulation of the device models of the production route using the print job (PDL) specifications in item 21. The list comprises only a trimmed width value.

The fourth device object 39 comprises a list of smart default values for trimmer parameters for the first specific trimmer labelled "A1Trimmer" with feedback on possible constraints resulting from simulation of the device models of the production route using the print job (PDL) specifications in item 21. The list comprises only a trimmed height value.

Instead of using one three-sided trimmer as in the first production route 32 in FIG. 2, in the second production route 34 in FIG. 3 two trimmers represented by the third device object 38 and the fourth device object 39 are used in the second production route 34. The device objects 36, 37, 38, 39 in the booklet maker inline production route 34 all represent inline devices again but have specific device constraints or policies. In fact, the media size remains SRA3, but the first trimmer labelled "F1Trimmer" and the second trimmer labelled "A1Trimmer" cannot reduce a height to the trim box height of 148 mm. A line in the list of smart values in the third device object 38 shows that the F1Trimmer can only reduce the height of SRA3 to 197 mm. A line in the list of smart values in the fourth device object 39 shows that the A1Trimmer can only reduce the height of SRA3 to 290 mm. Therefore the third device object 38 as well as the fourth device object 39 comprise a red alert icon 35A, 35B respectively to indicate the height restriction of the respective device 38, 39.

Near the fourth device object 39 no preview box is shown since the document cannot be produced by the second production route 34 in the work space 25. A preview box may be made visible when the second production route 34 or device parameters are changed or extended making the second production route 34 feasible.

In the top of the window 20 a preview area 24 is shown which is empty for the second production route 34 since the selected production route 34 does not result in an end product as desired.

Figure 4:
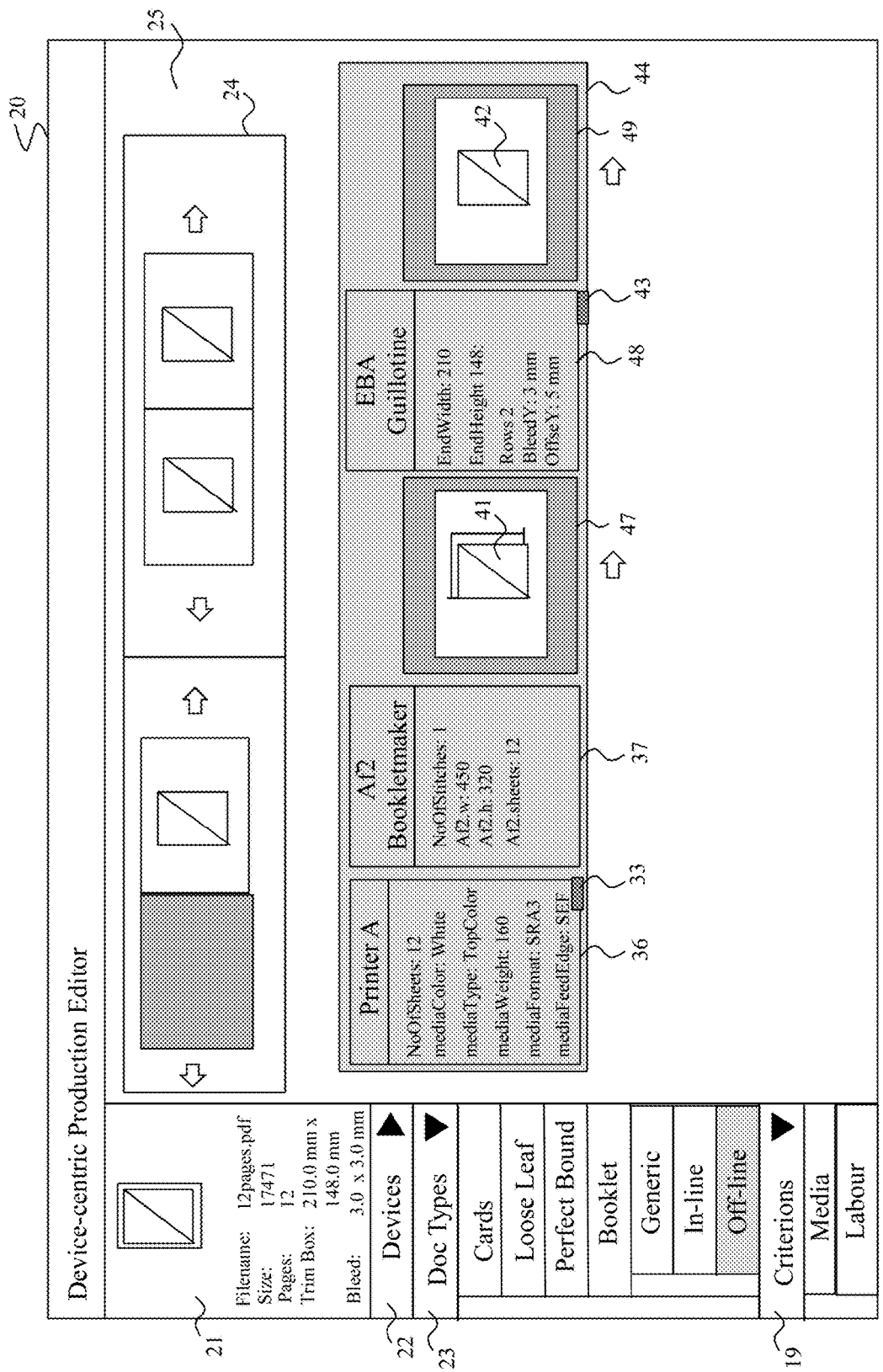

FIG. 4 is an example of a third production route 44 according to the invention. The first tab item 22 is again used to select at least one device object for the production route to be created. By means of the second tab item 23 a document type is selected that is going to be produced according to the production route which is selected according to the selection in the second tab item 23.

The third production route 44 is added to the workspace 25 in window 20 replacing the second production route 34 as shown in FIG. 3.

The third production route 44 is constructed by selecting the booklet option "Off-line" from the document types 23.

The third production route 44 comprises the first device object 36 representing a specific printer as in FIG. 3, the second device object 37 representing a specific booklet maker as in FIG. 3 and a third device object 48 representing a specific guillotine.

The third device object 48 comprises a list of smart default values for trimming parameters for the specific guillotine labelled "EBA Guillotine" with feedback on possible constraints resulting from simulation of the device models of the production route using the print job (PDL) specifications in item 21. The list comprises a trimmed end width value, a trimmed end height value, a number of rows, a BleedY value and an OffsetY value. A green execution button 43 may be activated to send the print job to the specific guillotine labelled "EBA Guillotine".

Instead of using one three-sided trimmer as in the first production route 32 in FIG. 2 and the two trimmers as in the second production route 34, in the third production route 44 a guillotine represented by the third device object 48 is used in the production route 44. The device object 48 in the booklet maker offline production route 44 represents an off-line device. The media size remains SRA3, but as a default selection criterion according to the invention focuses on minimizing waste, a same-up imposition is proposed (i.e. rows is equal to 2) where the bleed and trim information is taken over from the PDF file.

Near the second device object 37 and the third device object 48 preview boxes 47, 49 are respectively shown which represent an intermediate product 41 (work-in-progress preview) and the end product 42 respectively.

When processing another PDF file with the second production route 34 in FIG. 3, another media size may be proposed, so that a value for "trimmedWidth" as in FIG. 3 may be for example manually changed from 140 to 147, e.g. overruling the trim box in order to minimize waste.

The user may fix some smart parameter values despite a change of document type. For example, when switching from the second production route 34 shown in FIG. 3 to the third production route 44 shown in FIG. 4 for the other PDF file as mentioned here-above, the manual selection of the "trimmedWidth" value of 147 mm. may be taken over in the third production route 44 as a value of "EndHeight" from "trimmedWidth" to "endWidth". The user may manually fix or change some settings which has an effect that the device policies will not change these settings when seeking for optimal defaults. A manual fix or change can be undone. When switching between production routes, the settings fixed or changed in an earlier production route are mapped to the newly selected production route and not overruled by the device policies of the new production route.

Figure 5:
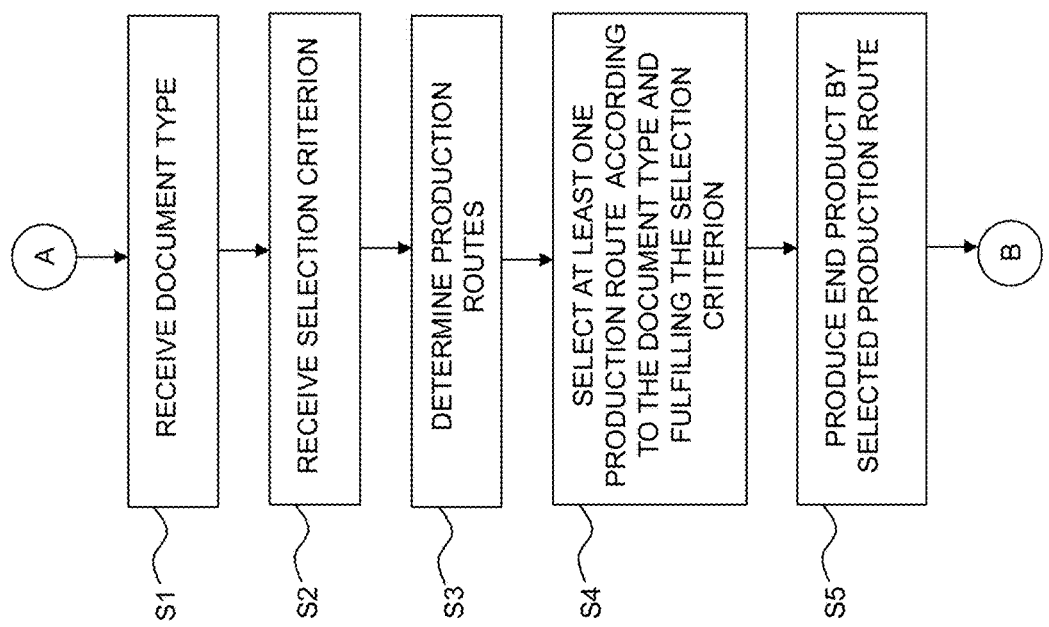
FIG. 5 is a flow chart showing essential steps of a method according to the invention.

FIG. 5 is a flow chart showing essential steps of a method according to the invention. The method is suitable for producing the print end product by the document processing system 1. The user interface displays production routes for a print job leading to an end product due to printing by the at least one printer of the document processing system 1 and due to finishing by at least one finisher of the document processing system 1.

The method starts in a start point A which leads to a first step S1.

In the first step S1 the user interface receives a user selection of a document type of the print job.

In a second step S2 the user interface receives at least one selection criterion for the print job.

In a third step S3 the print controller determines production routes based on simulation of the print job by device models for the at least one printer and the at least one finisher.

In a fourth step S4 the print controller selects from the determined production routes a production route with smart settings which corresponds to the received document type and fulfills the received selection criterion. If more than one production route is selectable the print controller may rank the production routes according to the concatenation of production steps in the production routes. By showing the various options at the user interface of the document processing system 1 that all result in the desired end product and informing the user about properties of these options via the user interface, the user is able to quickly select the best option. Even more, given a certain selection criterion and a way to represent it into a comparable value—e.g. waste may be expressed in a total weight of the wasted media—the selection of the best option may be automated.

By recognizing constraints and capabilities of the devices and the related production steps, the number of available production routes is pruned leaving at the end a best production route.

Every processing step may become interactive by means of the editability of the smart value parameters in each device object in a production route. The mentioned interactivity gives additionally a possibility to provide user interface automatons. An example is for instance when a stack of sheets arrives at a trimmer, a user interface automaton may precisely give feedback on an allowed range of trimmed output sizes. Another example is stitch positions which desired location may be calculated from an input stack and an amount of stitches.

In a fifth step S5 the end product is produced according to the determined production route by the at least one printer and the at least one finisher.

The skilled person will recognize that other embodiments are possible within the scope of the appended claims.

The invention claimed is:
1. A document processing system comprising:
a print controller connected to at least one printer; and
a user interface for displaying production routes for a print job leading to an end product due to printing by the at least one printer and due to finishing by at least one finisher,
wherein the user interface is configured to receive a user selection of a document type of the print job and at least one selection criterion for the print job,
wherein the print controller is configured to determine production routes based on simulation of the print job by device models for the at least one printer and the at least one finisher, and to select from the determined production routes a production route with smart settings which corresponds to the document type and fulfills the selection criterion
wherein the user interface is configured to receive at least one smart setting value to be fixed for the selected production route, and
wherein the print controller is configured to enable swithcing from the selected production route to one other production route on request of the user via the user interface and to prohibit the one other production route to overrule the at least one fixed smart setting value of the selected production route.

2. The document processing system according to claim 1, wherein the selection criterion is an ecological criterion like decreasing waste of recording material to be consumed for the print job.

3. The document processing system according to claim 2, wherein the print controller is configured to derive trim and bleed information from the print job and to take the derived trim and bleed information into account for the ecological criterion.

4. The document processing system according to claim 1, wherein the selection criterion is a preference criterion for a same up printing and finishing.

5. The document processing system according to claim 1, wherein the selection criterion is a productivity criterion which is one out of minimizing manual labor at printing and finishing, meeting a delivery time for the end product and meeting a specified quality of the end product.

6. The document processing system according to claim 1, wherein the selection criterion provides a selection between a first production route comprising an in-line finisher and a second production route comprising an off-line finisher.

7. A method for producing a print end product by a document processing system comprising a print controller connected to at least one printer and a user interface for displaying production routes for a print job leading to an end product due to printing by the at least one printer and due to finishing by at least one finisher, the method comprising the steps of:
   the user interface receiving a user selection of a document type of the print job;
   the user interface receiving at least one selection criterion for the print job;
   the print controller determining production routes based on simulation of the print job by device models for the at least one printer and the at least one finisher;
   the print controller selecting from the determined production routes a production route with smart settings which corresponds to the document type and fulfills the selection criterion;
   the user interface receiving at least one smart setting value to be fixed for the selected production route;
   the print controller switching from the selected production route to one other production route on request of the user via the user interface and to prohibit the one other procudtion route to overrule the at least one fixed smart setting value of the selected production route; and
   producing the end product according to the determined production route by the at least one printer and the at least one finisher.

8. The method according to claim 7, wherein the method comprises the step of the selection criterion providing a selection between a first production route comprising an in-line finisher and a second production route comprising an off-line finisher.

9. A non-transitory software medium comprising executable program code configured to, when executed, perform the method according to claim 7.

10. A document processing system comprising:
   a print controller connected to at least one printer; and
   a user interface for displaying production routes for a print job leading to an end product due to printing by the at least one printer and due to finishing by at least one finisher,
   wherein the user interface is configured to receive a user selection of a document type of the print job and at least one selection criterion for the print job,
   wherein the print controller is configured to determine production routes based on simulation of the print job by device models for the at least one printer and the at least one finisher, and to select from the determined production routes a production route with smart settings which corresponds to the document type and fulfills the selection criterion,
   wherein the selection criterion is an ecological criterion like decreasing waste of recording material to be consumed for the print job, and
   wherein the print controller is configured to derive trim and bleed information from the print job and to take the derived trim and bleed information into account for the ecological criterion.

* * * * *